(12) United States Patent
Park et al.

(10) Patent No.: US 9,275,395 B2
(45) Date of Patent: *Mar. 1, 2016

(54) OPTIMIZATION OF SOCIAL MEDIA ENGAGEMENT

(71) Applicant: BRIGHTEDGE TECHNOLOGIES, INC., San Mateo, CA (US)

(72) Inventors: Lemuel S. Park, Cerritos, CA (US); Jimmy Yu, Foster City, CA (US); Sammy Yu, San Mateo, CA (US); Emeka Ajoku, San Mateo, CA (US); Thomas J. Ziola, Menlo Park, CA (US)

(73) Assignee: BRIGHTEDGE TECHNOLOGIES, INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,314

(22) Filed: Nov. 7, 2014

(65) Prior Publication Data

US 2015/0066590 A1 Mar. 5, 2015

Related U.S. Application Data

(63) Continuation-in-part of application No. 13/476,893, filed on May 21, 2012, now Pat. No. 8,972,275, which (Continued)

(51) Int. Cl.
*G06Q 30/02* (2012.01)
*G06Q 10/10* (2012.01)
*G06Q 50/00* (2012.01)

(52) U.S. Cl.
CPC ............ *G06Q 30/0201* (2013.01); *G06Q 10/10* (2013.01); *G06Q 50/01* (2013.01)

(58) Field of Classification Search
CPC G06F 17/30864; G06F 30/0201; G06F 50/01
See application file for complete search history.

(56) References Cited

U.S. PATENT DOCUMENTS 7,548,929 B2 6/2009 Collins et al.
2008/0215607 A1 9/2008 Kaushansky et al.

(Continued)

FOREIGN PATENT DOCUMENTS

JP 2010-191963 A 9/2010
KR 10-2008-0031058 A 4/2008
WO 2007/002859 A2 1/2007

OTHER PUBLICATIONS

Sponder, Radian6 New Enhancements plus Social CRM, Web Trends and SalesForce Integration, 2009.

(Continued)

*Primary Examiner* — William Spieler
(74) *Attorney, Agent, or Firm* — Maschoff Brennan

(57) ABSTRACT

Methods for optimizing social media are disclosed. Such methods may include identifying at least one keyword utilized for at least one webpage, identifying social media correspondence referencing the at least one keyword, analyzing content collected from the social media to determine a frequency of references to the at least one keyword and generating at least one report including information based on the analysis. The report may include recommendations for optimizing social media by, for example, increasing visibility by using high-performing keywords. Systems for performing the methods are also disclosed.

12 Claims, 4 Drawing Sheets

Related U.S. Application Data is a continuation-in-part of application No. 13/409,730, filed on Mar. 1, 2012, now Pat. No. 8,909,651.

(60) Provisional application No. 61/449,064, filed on Mar. 3, 2011, provisional application No. 61/549,060, filed on Oct. 19, 2011.

(56) References Cited

U.S. PATENT DOCUMENTS

| | | | |
|---|---|---|---|
| 2008/0275783 | A1 | 11/2008 | Wee et al. |
| 2009/0006311 | A1 | 1/2009 | Ting et al. |
| 2009/0307056 | A1 | 12/2009 | Park et al. |
| 2010/0211455 | A1 | 8/2010 | Williams et al. |

OTHER PUBLICATIONS

Bermingham, et al., (Jul. 2009) Combining social network analysis and sentiment analysis to explore the potential for online radicalisation. In Social Network Analysis and Minin.
Chan, Radian6 screenshots of twitter influencer topical clouds, May 1, 2008.
eMarketer, Marketers Moving to Social Media, May 23, 2009.
Falls, Social Media Monitoring Grudge Match, Apr. 13, 2009.
Kelly, Should You Use Radian6 for Social Media Monitoring, Feb. 24, 2011.
Kim et al., Impact of Social Influence in E-Commerce Decision Making, Aug. 22, 2007.
Odden, Social Media and SEO, Apr. 15, 2009.
Schubring, 12 Social Media Monitoring Tools Revisited, Jul. 31, 2010.
Sponder, Finding Influencers using Social Media monitoring Tools, Feb. 8, 2010.
International Search Report dated Sep. 28, 2012 as received in application No. PCT/US2012/027327.
Written Opinion of the International Searching Authority dated Sep. 28, 2012 as received in application No. PCT/US2012/027327.
Rubel et al., "Search Engine Visibility" Edelman Digital, May 2009, pp. 2-13.
International Search Report dated Sep. 27, 2012 as received in application No. PCT/US2012/027333.
Written Opinion of the International Searching Authority dated Sep. 27, 2012 as received in application No. PCT/US2012/027333.
Taiwan Office Action dated May 28, 2015 as received in Application No. 101106656 (English Translation).

OPTIMIZATION OF SOCIAL MEDIA ENGAGEMENT

CROSS-REFERENCE TO RELATED APPLICATIONS

This patent application claims priority to U.S. patent application Ser. No. 13/409,730, filed on Mar. 1, 2012, which claims priority to U.S. Provisional Patent Application No. 61/449,064, filed on Mar. 3, 2011, and to U.S. Provisional Patent Application No. 61/549,060, filed on Oct. 19, 2011. The foregoing applications are incorporated herein by reference in their entireties.

TECHNICAL FIELD

Technologies described herein related generally to social media and, more particularly, to methods and systems for optimizing social media engagement.

BACKGROUND

Social media websites are becoming increasingly popular by having the abilities of connecting users and communities in a collaborative way. Social media services explore the opportunities for advanced communication and also serve as an advanced content sharing mechanism. Examples include not only social networking services (SNSs), such as MYSPACE and FACEBOOK, but also telecom operator's services such as messaging, photo-sharing, person-to-person as well as conference calls and even microblogging services such as TWITTER.

Millions of users are actively using services provided by such social media websites, exposing new trends in communication and content sharing that has not been typical in the past. For example, TWITTER has over 100 million active users generating over 250 million tweets per day (20 percent of which contain links). Thus, social media websites such as TWITTER, offer an attractive channel for online marketing and sales.

The overwhelming quantity of information available from social media websites creates challenges in effectively using such information in marketing strategies. Conventional social media analysis has focused on brand monitoring and reputation management on such social media websites. It would be desirable to provide methods and systems for exploring ways to drive acquisitions through social media websites.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Technologies described herein relate generally to methods for optimizing social media engagement. In some embodiments, such methods may include identifying one or more search engine optimization keywords utilized for one or more webpages and identifying social media correspondence referencing the one or more search engine optimization keywords. The method may further include recommending material related to the webpages that contain the search engine optimization keywords referenced in the social media correspondence for engagement in the social media.

In other embodiments, such methods may include collecting content from a plurality of webpages by crawling at least one network, searching the content collected from the plurality of webpages to identify references to at least one keyword, analyzing the content to determine a frequency of the references to the at least one keyword associated with at least one of the plurality of webpages, the relevant references generated by users of social media and generating at least one report for display, the report comprising information based on the content.

Technologies described herein relate generally to systems for optimizing social media. Such a system may include, for example, a deep index engine configured to crawl a plurality of webpages and to identify social media correspondence located on the plurality of webpages, an analyzing module configured to analyze the social media correspondence to identify references to at least one keyword in the social media correspondence and to create at least one report based on the references to the at least one keyword and a reporting module for generating at least one report for display to a user, the report comprising information based on the analysis of the social media.

These and other aspects of example embodiments of the invention will become more fully apparent from the following description and appended claims.

BRIEF DESCRIPTION OF THE DRAWINGS

To further clarify various aspects of some embodiments of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings.

DETAILED DESCRIPTION

Figure 1A:
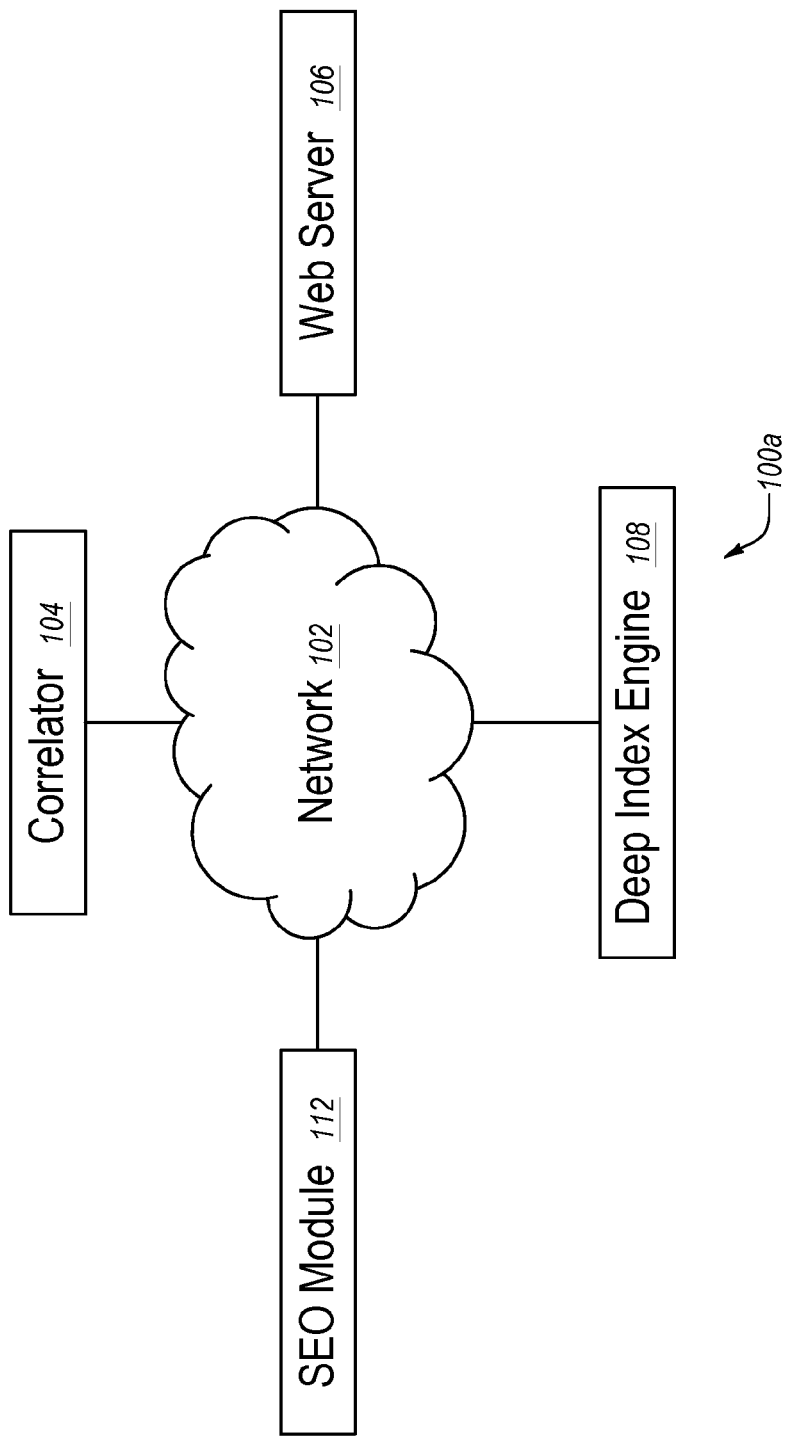
FIG. 1A illustrates an embodiment of a social media engagement system in accordance with the technologies described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With the rise in the wide spread use of social media and its integration into the daily lives of internet users, companies and individuals (e.g., "entities") are realizing the benefits that may be achieved by using social media in their marketing strategies. As entities turn to social media, it may be desirable to be able to identify when social media correspondence relates to content on the entities' webpages. It may further be desirable to provide the ability to engage in the social media correspondence using the content from the entities' webpages.

Accordingly, embodiments disclosed herein generally relate to computing systems and computing processes used in methods of optimizing social media engagement by tracking and engaging in social media correspondence. By engaging in social media correspondence, an entity can achieve greater brand visibility. Furthermore, engaging in social media correspondence can lead to increased traffic of an entity's main webpage and better page rank for the entity's webpage.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

FIG. 1A illustrates an embodiment of a social media optimization system 100a, which can include a network 102. In some embodiments, the network 102 can be used to connect the various parts of the system 100a to one another, such as between a web server 106, a deep index engine 108, a correlator 104, and a social media optimization module 112. It will be appreciated that while these components are shown as separate, the components may be combined as desired. Further, while one of each component is illustrated, the system 100a may optionally include any number of each of the illustrated components.

The network 102 may include the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 102 includes one or more cellular RF networks and/or one or more wired and/or wireless networks such as, but not limited to, 802.xx networks, Bluetooth access points, wireless access points, IP-based networks, or the like. The network 102 can also include servers that enable one type of network to interface with another type of network.

The web server 106 can include any system capable of storing and transmitting a webpage to a user. The web server 106 can provide access to the webpages of a website to be analyzed for improving social media optimization. For example, the web server 106 can include a computer program that is responsible for accepting requests from clients (user agents such as web browsers), and serving them HTTP responses along with optional data contents, which can include HTML documents and linked objects for display to the user. Additionally or alternatively, the web server 106 can include the capability of logging some detailed information, about client requests and server response, to log files.

The website can include any number of webpages. The aggregation of references to the various webpages can be referred to as traffic. It should be noted that the term webpage, as used herein, refers to any online posting, including domains, subdomains, web posts, Uniform Resource Identifiers ("URIs"), Uniform Resource Locators ("URLs"), images, videos, or other piece of content and non-permanent postings such as e-mail and chat, unless otherwise specified.

In some embodiments, the deep index engine 108 may be configured to crawl the webpages accessed by the webserver 106 to retrieve external data. As used herein, terms "crawl" and "crawling" may refer to collecting content of multiple files or sites (e.g., webpages) on the network 102 so that the content may be searched. In particular, the deep index engine 108 may be configured to crawl the webpages and analyze data associated with the crawl, including on-page information and back link data (e.g., back link URL, anchor text, etc.) for each webpage. The deep index engine 108 may be configured to crawl webpages via the Internet and/or via a wireless network. Social media is often accessed using a mobile device (e.g., a mobile phone, a personal digital assistant (PDA), a tablet computer, etc.) through the wireless network. The deep index engine 108 may utilize an algorithm or software mechanism (e.g., a crawler) to crawl the files or sites on the network 102 for the content.

Thus, the webpages crawled by the deep index engine 108 through the wireless network may provide user-specific and/or location-specific information. A deep index engine 108 according to some embodiments is described in more detail in copending U.S. patent application Ser. No. 12/436,704 entitled COLLECTING AND SCORING ONLINE REFERENCES, filed May 6, 2009, which application is hereby incorporated by reference in its entirety. The functionalities described herein can be applied to optimizing webpages for a website.

A correlator 104 according to some embodiments is described in more detail in copending U.S. patent application Ser. No. 12/574,069, filed Oct. 6, 2009 entitled CORRELATING WEB PAGE VISITS AND CONVERSIONS WITH EXTERNAL REFERENCES, which application is hereby incorporated by reference in its entirety. The functionalities described herein can be applied to optimizing webpages for a website.

The correlator 104 or other component may be configured to collect web analytics data from the webpages. The web analytics data may be used in estimating the cost, value, or both, associated with one or more search engine optimization (SEO) or social media optimization opportunities. Examples of web analytics data that may be collected include number of visitors, page views, conversions (e.g., purchases), and the like or any combination thereof.

The social media optimization module 112 is configured for tracking, identifying, and analyzing social media correspondence as well as orchestrating and performing the webpage analysis of a website as described herein so that recommendations can be made to improve social media interactions and increase the exposure of the entity to thereby improve the SEO of the website. The social media optimization module 112 may access the social media correspondence generated with a user device (e.g., a computer or a mobile phone) in communication with the network 112. The social media optimization module 112 is described in more detail herein.

Figure 1B:
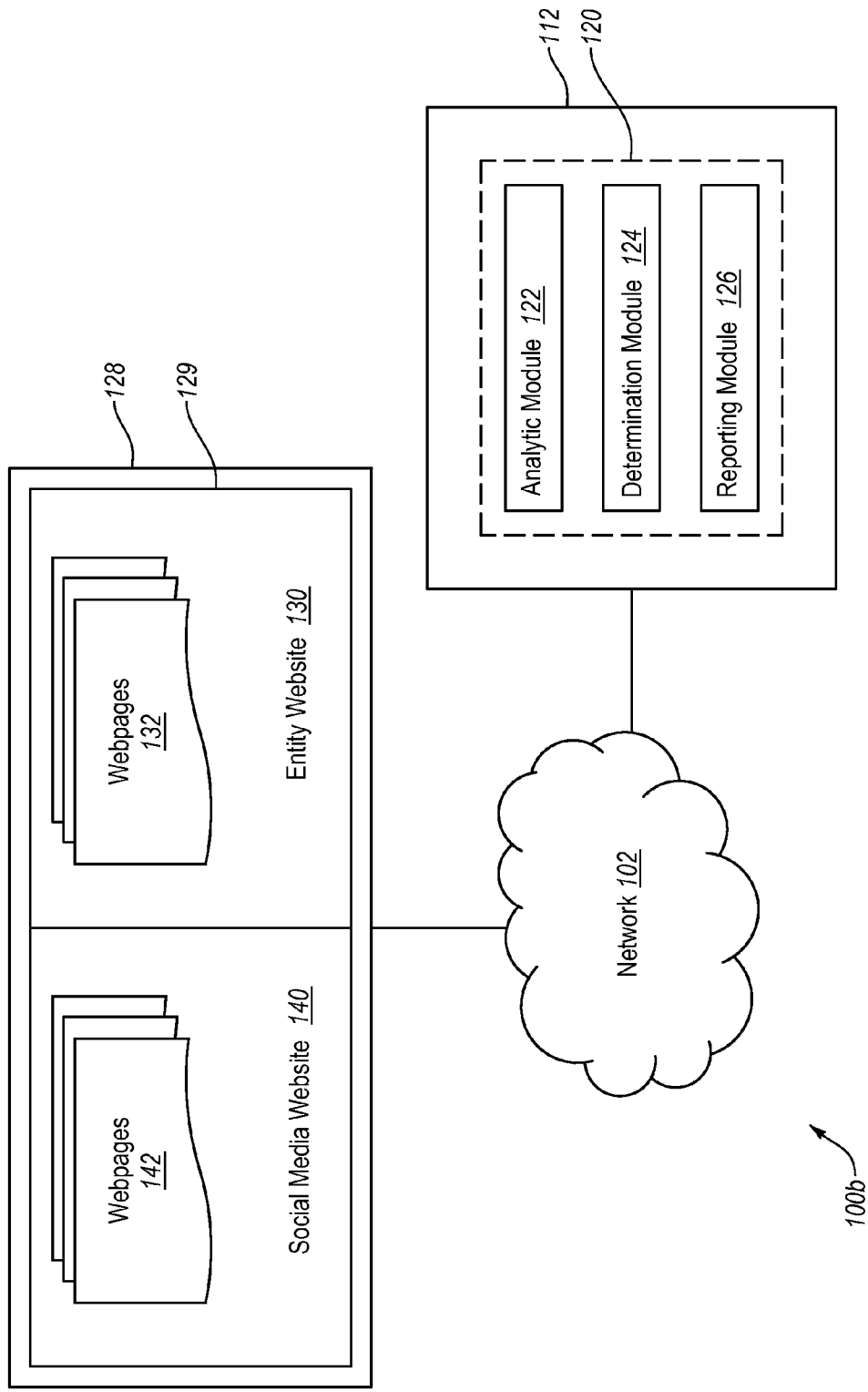
FIG. 1B illustrates another embodiment of a social media engagement system in accordance with the technologies described herein.

FIG. 1B illustrates another embodiment of a social media optimization system 100b. As shown, the network 102 operably couples the social media optimization module 112 with a website computing system 128. The social media optimization module 112 includes a computing system 120 configured to perform social media optimization analysis and produce recommendations as described herein. The computing system 120 can include submodules for implementing particular functionalities. The computing system 120 can be generic to and include an analytic module 122, determination module 124, and a reporting module 126.

The website computing system 128 can include a website database 129 that includes SEO data from entity webpages 132 from an entity website 130. The entity website 130 can be the website of an entity for which social media optimization is to be performed. The website database 129 can further include social media webpages 142 of a social media website 140. The social media website 140 can be any type of social media. For example, social media can include collaborative projects (e.g. WIKIPEDIA), blogs and microblogs (e.g. TWITTER), content communities (e.g. YOUTUBE), social networking sites (e.g. Facebook, virtual game worlds (e.g. WORLD OF WARCRAFT), and virtual social worlds (e.g. SECOND LIFE), among other types of social media and can take many different forms including Internet forums, weblogs, microblogging, social blogs, wikis, podcasts, photographs or pictures, video, rating, social bookmarking, and others. The social media webpages 142 can include any type of digital content that contains social media from the social media website 140.

For example, if the social media website 140 is a microblog or microblogging site, for example, TWITTER, the social media webpage 142 may include a single micropost, a home page of a user with a microblog account with a collection of the user's microposts, or any other digital content that contains microposts.

A micropost may include a message or post made public on a website or distributed to a specific group of subscribers, who can observe them over the network 102 via, for example, a computer or a mobile device. Such microposts may be, for example, a status update, a comment, a post (e.g., a website address) or a so-called "check in" at a particular location via social media. Such a micropost on Twitter® social networking service is often referred to as a "Tweet®." Users may copy and repost the tweet of another, which is often referred to as a "retweet." The micropost may include one or more so-called "hashtags," in which the "#" symbol is used to mark words or topics in a Tweet®. The micropost may also be a reply, such as another Tweet, in response to an original Tweet, which is often denoted with the "@" symbol and a username.

For customers looking to generate direct revenue, Tweets may be used to drive referral traffic and conversions from Twitter. However, this may be challenging for customers because it may require customers to identify high-value opportunities and respond very rapidly with relevant, compelling tweets and content.

As another example, if the social media website 140 is a social networking site, for example, FACEBOOK, the social media webpage 142 can be a networking page of a user, a post of a user, a comment, or any other digital content related to the social networking site. Additionally or alternatively, the website computing system 128 can contain a second website database so that the entity webpages 132 and the social media webpages 142 reside in separate databases. It should be understood that the data from the entity webpages 132 and the social media webpages 142 may be stored in any configuration without departing from the embodiments described herein.

The website computing system 128 can obtain data from the entity webpages 132 and the social media webpages 142 by accessing the entity website 130 and the social media website 140 through a web server, such as the web server 106 of FIG. 1A. Furthermore, the data from the entity webpages 132 and the social media webpages 142 can be collected by crawling the webpages 132, 142. In some embodiments, the webpages 132, 142 can be crawled using the deep index engine 108 of FIG. 1A, for instance. In some embodiments, the webpages 132, 142 can be crawled using a different mechanism.

The data may be obtained from the webpages 132, 142 during a predetermined aggregation period. For example, the predetermined aggregation period may be a time period, such as, one or more hours, days or weeks. As a non-limiting example, the data may be obtained during a single day or a single week.

In some embodiments, the website computing system 128 may conduct a keyword volume count in which each occurrence of the keyword is counted to determine keyword volume. The keyword volume may include a count or number of an exact and/or phrase match occurrence of the keyword in a social media correspondence, such as a Tweet. The occurrence of the keyword may be classified by according to a type of social media correspondence in which they appear.

In embodiments in which the social media correspondence is obtained from social media (e.g., TWITTER), each occurrence of the keyword may be classified as a reposting of correspondence posted by another (e.g., a retweet), a reply to correspondence (e.g., a TWEET) posted by another or an original correspondence (e.g., a TWEET). The keyword occurrences marked as a specific user-defined topic (e.g., by the "#" symbol) or marked by a username (e.g., by the "@" symbol) may count towards a number of mentions metric.

One or more keyword trends may be determined based on the keyword volume. Keyword trend strength may be calculated is calculated from a percent difference between the keyword volume and an average volume for the keyword over a predetermined time period (e.g., the aggregation period). As a non-limiting example, the aggregation period may be one day and they keyword trend strength may include a percent deviation from an average determined over another predetermined time period (e.g., 7 days). As another non-limiting example, the aggregation period may be one week and they keyword trend strength may include a percent deviation from an average determined over another predetermined time period (e.g., 4 weeks).

The website computing module 128 may additionally filter data from the entity webpages 132 and the social media webpages 142. The data may be filtered based on any relevant criteria, such as, a number of webpages or a period of time. As a non-limiting example, a sample size may be selected including a predetermined number of webpages and the website computing module 128 may be configured to obtain information from a sample of entity webpages 132 and/or the social media webpages 142 according to the relevant sample size. Thus, rather than obtaining data from each webpage including the SEO keyword input by a third party, the data may be filtered to include a particular number or percentage of webpages, or to include one or more websites of interest. The sample may from the entity webpages 132 and the social media webpages 142 may be used to determine a frequency of SEO keyword. Using the filtered data, the frequency at which the SEO keyword occurs in webpages (e.g., the entity webpages 132 and the social media webpages 142) may be estimated. For example, if the sample size is fifty (50) percent of the webpages, the number of references to the SEO keyword appearing in the webpages obtained from the sample may be doubled to provide an estimate of the actual number of references to the SEO keyword. If the data obtained from the sample indicates a low number of references to the keyword, or no references to the keyword, a larger sample size may be selected or the filter may be removed to ensure accuracy of the estimate.

As another non-limiting example, the data may be filtered based on predetermined period of time. A period of time may be selected and the number of references to the SEO keyword that appear on the webpages during the period of time may be determined. Thus, the frequency of references to the SEO keyword during the predetermined period of time may be determined.

The filtering criteria may be dynamically changed based on the information collected. For example, the group of webpages crawled the period of time, or the SEO keywords may be modified as additional information is gathered an analyzed. Furthermore, filtering data may be used to estimate the frequency of references to the SEO keywords appearing on webpages, to determine the frequency of references to SEO keywords appearing on the webpages in a predetermined period of time, and/or to determine a frequency of references to the SEO keywords appearing on a predetermined group of webpages. Because businesses may be charged a fee per each of the SEO keywords they select, filtering the data is useful in providing such businesses with an estimate of potential costs associated with such services.

Referring again to the computing module 120, the analytic module 122 within the computing module 120 can be configured to analyze the webpages 132, 142 to obtain data from the webpage 132, 142. The analytic module 122 can include one or more algorithms for analyzing the webpages 132, 142. In some embodiments, the analytic module 122 can analyze on-page data, source code, or any other data of the entity webpages 132 to identify SEO keywords, which may include any branded names of the entity or other words or string of words that are associated with the entity, product names produced by the entity, product categories, relevant search terms, general topics, and other words or strings of words used in SEO.

In some embodiments, the analytic module 122 can analyze on-page data, source code, or any other data of the social media webpages 142 to identify social media correspondence. Social media correspondence can be any data placed on the social media webpages 142 by a user of the social media website 140 that can be read by other users of the social media website 140. For example, in some embodiments, social media correspondence can include posts, comments, or both on a social networking website. In some embodiments, social media correspondence can include posts, comments, or both on a blog or microblog. It should be understood that the aforementioned are only some examples of different types of social correspondence and that the scope of social media correspondence as used herein should not be limited in anyway by these examples.

Additionally or alternatively, after the analytic module 122 identifies the social media correspondence located on the social media webpages 142, the analytic module 122 can further analyze the social media correspondence for one or more words, phrases, or other data using one or more algorithms. For example, in some embodiments, the analytic module 122 can analyze the social media correspondence to identify the SEO keywords identified by the analytic module 122 in the entity webpages 132.

Additionally or alternatively, the analytic module 122 can analyze the on-page data, source data, or both of the social media webpages 142 and/or the social media website 140 to identify information about specific users of the social media website 140. The identified information can include the social media participation of a user as well as content provided or discussed by the user. The social media participation of the user can include how often the user participates in the social media, such as the number of social media correspondences produced by the user. Additionally or alternately, the social media participation of the user can include how many other users of the social media follow, view, comment on, reference, contribute to, or otherwise acknowledge the social media correspondence produced by the user. The analysis may enable preparation of recommendations to improve visibility by using high-performing keywords (e.g., keywords with a higher than average number of references and/or providing a higher than average return on investment). For example, the analysis of keyword trends may be utilized to provide information about valuable keywords trending on social media, and to show how individual webpages rank and convert on the high-performing keywords, to provide alerts on opportunities to drive engagement on social using existing content, and to prioritize which social media opportunities will be most effective if pursued. The recommendations may further include one or more webpages determined to be relevant for targeting consumers identified as interested in the specific keywords. For example, consumers interested in the selected keywords may be identified and a determination may be made as to which webpages will be the best to use for targeting those consumers based on the selected keywords. Such webpages may be identified based on an analysis of rankings obtained from one or more search engines, an amount or type of traffic, conversions, bounce rate, conversion rate and revenues. As a non-limiting example, the recommendation may include webpages determined to be well-ranked and/or to have a higher than average number of visits or conversions.

Some embodiments further relate to analytics and/or the generation of analytics related to the identification of social media correspondence and SEO keywords. The analytics may be derived from the information received from or collected from the webpages 132, 142. Such information may also be used for targeted marketing across platforms. The information can also be used to generate revenue. The information may be used to target specific advertisements to specific consumers. In addition, demographics such as demographics of consumers (when provided), types of devices, types of content, and the like may be collected and used to generate analytics.

The information may also be used to determine a value of the SEO keywords or the webpages 132, 142 and/or to rank the SEO keywords or the webpages 132, 142. For example, information indicating that the SEO keywords are references in social media correspondence more frequently than other SEO keywords is information that may be used by to rank the relevance of the SEO keywords and/or the webpages 132, 142. More frequently referenced SEO keywords may be ranked higher than other less referenced SEO keywords. The webpages 132, 142 referencing a particular SEO keyword of interest more frequently than other webpages may be ranked higher than the other webpages. This information may also be used, for example, to predict or determine price points for social media engagement.

In another example, the analytics may be used to predict which SEO keywords are more likely to be referenced in social media and/or which webpages are most likely to include the references to the SEO keywords.

The analytics may also be used to determine the SEO keywords that provide the highest return on investment (ROI). As used therein, the term "return on investment" may refer to revenue generated from the SEO keywords or popularity of the keywords in comparison to the costs associated with use of the SEO keywords.

Additionally, one or more webpages having the highest number of references to the SEO keyword may also be determined. For example, the webpages may be sorted in the order of the frequency of keywords associated with the social media. The webpages including the highest number of references to the SEO keyword may be determined and those webpages may be targeted and optimized. In identifying the most relevant SEO keywords in the social media and the webpages most relevant to particular SEO keywords, the social media optimization system 100b described herein enables tailoring of marketing strategies to optimize SEO keyword usage.

The determination module 124 may also be configured to determine one or more webpages that are being shared in social media regardless of the SEO keywords. Information related to such webpages may be analyzed to determine the SEO keywords associated therewith and to optimize social media correspondence.

The determination module 124 can obtain data from the analytic module 122 and use the data to determine which identified social media correspondences contain the SEO keywords identified in the entity's webpages 132. The determination module 124 can include one or more algorithms for processing the data obtained from the analytic module 122. Additionally or alternatively, the determination module 124 can determine the frequency that the SEO keywords from the entity's website 132 appear in the identified social media correspondences and rank the SEO keywords accordingly. Additionally or alternatively, the determination module 124 can determine if there is an increase in use of one or more of the identified SEO keywords over a period.

Additionally or alternatively, the determination module 124 can determine a rank of the social media participation of a user of the social media website 140 with respect to other users of the social media website 140. For example, for a microblog, such as TWITTER, the number of followers, retweets, and views of a user's TWEET can be used to rank a user as compared to all other users of TWITTER. Additionally or alternatively, the determination module 124 can also determine the rank of the social media participation of a user employing other factors, such as by using influence and participation rankings produced by other websites or entities. Additionally or alternatively, the determination module 124 can determine which users of the social media website 140 are discussing, providing, viewing, or otherwise associating with social media correspondence that relates to the identified SEO keywords.

The reporting module 126 can compile information from the analytic module 122, determination module 124, or both to generate various types of reports and make recommendations to improve social media optimization. The reporting module 126 can include one or more algorithms that can generate one or more reports and provide one or more recommendations for improved social media optimization.

The determination module 124 may access data from one or more mobile devices via a wireless network to gather information and can generate marketing information based on location. For example, location tagging on social media correspondence or login/check-in information provided in social media correspondence may be analyzed to determine references to keywords based on location.

The determination module 124 may analyze trends associated with the SEO keywords, such as growth in social media correspondence and demographics (e.g., gender, race, age, interests, education, employment status, and location), consumption and creation of content. The information obtained from such analysis may be provided, for example, in a report, an electronic report and/or an electronic notification, and may be used to tailor marketing strategies. The electronic report may be, for example, displayed on the screen of a computer, downloaded into one or more electronic file formats or printed onto paper.

Such reports generated based on the collected information may include, for example, activity reports, stimulus reports, dynamic maps, etc. The reports may include information related to the webpages, the SEO keywords, the social media, or users of the social media. As a non-limiting example, such a report may include a dynamic map of activity associated with the SEO keywords or with webpages including at least one reference to the SEO keyword. As another non-limiting example, such a report may include an analysis of the webpages according to the references to the SEO keyword (e.g., webpages with the highest number of occurrences). As yet another non-limiting example, such a report may include demographic information about the users associated with the references to the SEO keyword.

For example, an all keywords report may be generated that enables users to quickly observe what keywords and webpages may most effectively drive revenue. Such keywords may be those with the highest number of references in social media or may be those with the greatest increase in references within a predetermined time period. The all keywords report may additionally provide information about which keywords within a group of multiple keyword groups (e.g. multiple product categories) are increasing in social media correspondence. Such webpages may be those that include the highest number of references to one or more selected keywords or may be those in which the frequency of references to the selected keywords is increasing most rapidly. As a non-limiting example, the report may provide information related to the keywords and webpages to include in social media correspondences, such as a TWEET made by a user of TWITTER, to drive revenue. For example, the report may provide information about the strongest trending keywords and the high-value pages and opportunities related to those keywords. The all keywords report may include, for example, a stack bar-chart showing total keyword volume by keyword trend strength.

The reports may be customized according to customer specifications. For example, the reports may be customized to include keywords with 0 percent or less deviation from average, keywords trending above 0 percent but less that 50 percent above average, keywords trending above 50 percent but less that 100 percent from average, and/or keywords trending 100 percent or more above average. The reports may include data from any number of aggregation periods.

As a non-limiting example, the report may be an electronic report including web-based graphical user interfaces, or screens, in which the data may be viewed. The electronic report may include one or more buttons that links to a map of each trend strength category. When any of the buttons is selected, the keyword data may be filtered. For example, wherein the data may be filtered or sorted to show only the keywords that fall in the specific trend category described by the button.

The reports may include any number of fields, each of which may be related to the keyword or to the social media. As non-limiting examples, the fields may include the keywords having the highest volume (e.g., keyword rank), the webpages having the highest number of references to the keyword (e.g., top ranked webpages), organic search revenue for the keyword during a predetermined time period, and/or a percent change in the keyword volume. A trending report may be generated that includes the top ranked webpage for each keyword and one or more other webpages including the keyword.

The reports may include a function that enables display of information for a particular date and/or time. For example, a particular date in the past may be selected and data from that date may correspond to that date.

The report may also include an option to export the data in to another format, such as, a text file, a comma-separated values (CSV) file, or any other type of file. The exported data may include all or a portion of the data shown in the electronic report. The exported data may additional include, for example, a number of visits, a number of webpage views, conversations and/or orders within a predetermined time period. The reports may also be configured into one or more at-a-glance views or so-called "dashboards." The keyword link between social media correspondence and webpages may be used to generate specific recommendations to leverage those webpages and drive engagement and revenue on the social media. Such recommendations will be tied to the keyword and the webpage.

Providing customers with such tools for optimizing social media efforts and campaigns enables the customers to maximize engagement, traffic and conversions through the social media, such as Twitter.

Figure 2:
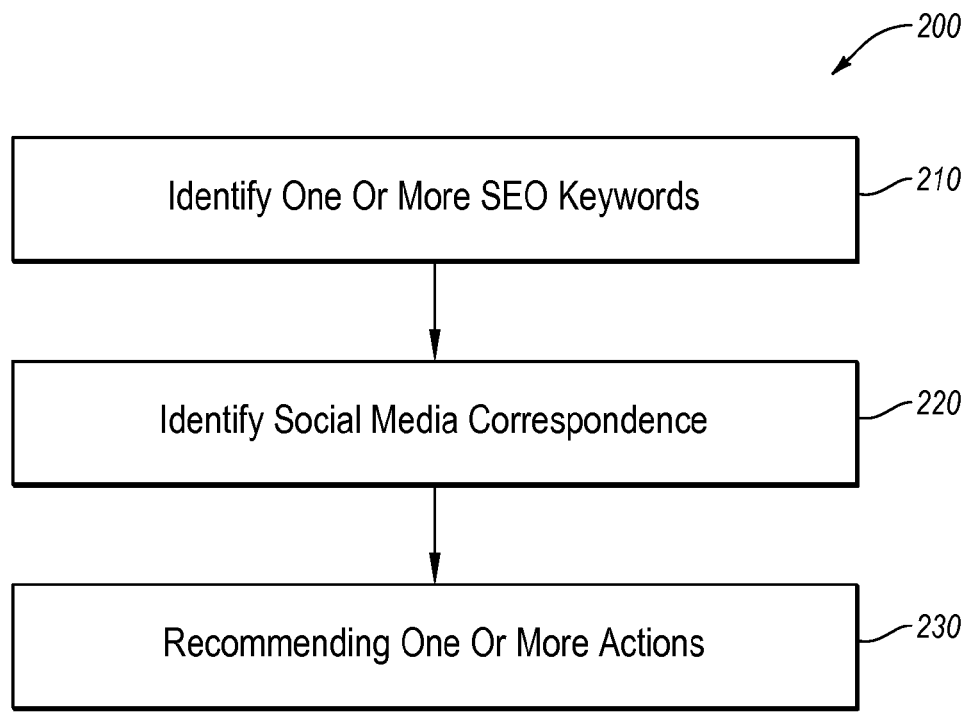
FIG. 2 is a flow type diagram illustrating an embodiment of a method of increasing social media engagement in accordance with the technologies described herein.

FIG. 2 illustrates an embodiment of a method 200 for increasing social media engagement. The method 200 can be implemented in the social media optimization system 100a or 100b of FIG. 1A or 1B, for instance. The method 200 may include identifying one or more SEO keywords from a webpage of an entity at block 210. In some embodiments, identifying one or more SEO keywords from the webpage of the entity can include crawling the website of the entity, obtaining SEO data from the website, and identifying the SEO keywords. The SEO keywords can include any branded names of the entity or other words or string of words that are associated with the entity, product names produced by the entity, product categories, relevant search terms, general topics, and other words or strings of words used in SEO.

The method 200 can further include identifying social media correspondence from social media webpages that reference the SEO keywords at block 220. In some embodiments, identifying social media correspondence from the social media webpage can include crawling the social media webpage, obtaining SEO data from the webpage, and analyzing social correspondence located on the social media webpage for references to the previously identified SEO keywords. In some embodiments, the SEO keywords referenced more often in the social media correspondences may by noted. Additionally or alternatively, the frequency that SEO keywords are referenced in social media correspondence may be determined and tracked to create a moving average of the number of references. If the number of social media correspondences that reference a particular SEO keyword is above or below the moving average of number of references for that SEO keyword or string of keywords, the SEO keyword or string of keywords may be noted.

In some embodiments, the method 200 may further include identifying social media participants with higher than average social media participation. Social media participants with higher than average social media participation may be considered influential participates. These social media participants may be identified based on one or more factors. Factors may include the number of social media participant followers, the number of social media correspondences produced, and other factors.

In some embodiments, the method 200 may further include identifying specific social media participants that have provided input to the social media with respect to the social media correspondence referencing the SEO keywords.

The method 200 can further include recommending material, related to webpages that contain the SEO keywords referenced in social media correspondence, for engagement in the social media at block 230. Engagement in the social media can include contributing to the social media by producing social media correspondence, distributing social media correspondence, or some other contribution. In some embodiments, the material related to all SEO keywords referenced in the social media correspondence can be used to engage in the social media. Additionally or alternately, only material related to SEO keywords that are above the moving average for the number of social media correspondences that reference the SEO keywords can be used to engage in the social media. Additionally or alternately, only material related to SEO keywords that are below the moving average for the number of social media correspondences that reference the SEO keywords are used to engage in the social media. Additionally or alternatively, only material related to an SEO keyword with the highest number of references in the social media correspondence or a predetermined percentage of SEO keywords with the highest number of references is used to engage in the social media. In some embodiments, the material related to the SEO keywords is the material from a webpage from which the SEO keywords are derived.

Additionally or alternately, the method 200 can include recommending that social media participants that have provided social media correspondence referencing the SEO keywords be engaged with material related to the SEO keywords. Social media participants can be engaged by sending the social media participants new social media correspondence, replying to social media correspondence produced by the social media participants, or otherwise engaging with the social media participants through the social media. Additionally or alternatively, the method 200 can include recommending that social media participants with higher than average social media participation be engaged with material related to the SEO keywords that the social media participants have previously included in their social media correspondence.

Additionally or alternatively, the method 200 can include recommending the suggestion of new or additional content for a webpage of a user related to SEO keywords that have been identified in social media correspondence.

In some embodiments, the method may further include providing an entity with data concerning the number of SEO keywords referenced in the social media correspondence over a period. The data can come in the form of a report with one or more images, charts, graphs, or other display. Additionally or alternatively, the entity can be provided with data concerning the social media correspondences that reference a certain SEO keyword, any SEO keywords, or a combination of SEO keywords over a period.

An example of the method 200 is as follows. An entity, such as a shoe store may have a website with webpages that display and offer shoes for sale. The webpage may be crawled and SEO keywords, such as the brand of the shoes and other words such as, shoe, performance, running, and others may be identified. The webpages of the social media may also be crawled. For example, all of the webpages of the website TWITTER may be crawled, and social media correspondence, such as, a TWEET, may be identified and analyzed to identify SEO keywords within the social media correspondence. A recommendation may be made to the shoe store to engage in the social media by generating and posting TWEETS including information about the shoes, such as a sale, benefits of the shoes, or other material, based on the SEO keywords that were identified in the social media correspondence.

Some embodiments disclosed herein include a computer program product having computer-executable instructions for causing a computing system having the computer program product to perform a computing method of the computer-executable instructions for improving SEC) of social media webpages of an entity. The computing method can be any method described herein as performed by a computing system. The computer program product can be located on a computer memory device, which may be removable or integrated with the computing system.

Some embodiments include a computing system capable of performing the methods described herein. As such, the computing system can include a memory device that has the computer-executable instructions for performing the method.

In some embodiments, a computing device, such as a computer or memory device of a computer, can include an analytic module, determination module, and reporting module. The analytic module, determination module, and reporting module can be configured to perform any of the methods described herein. Also, the analytic module, determination module, and reporting module can be combined into a single module or on a single platform.

The computer program product can include one or more algorithms for performing any of the methods of any of the claims. The computer program product can include one or more algorithms for performing any of the methods of any of the claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. It should also be recognized that any module or component described herein can implement the functionalities associated with the name of the module or component.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 3:
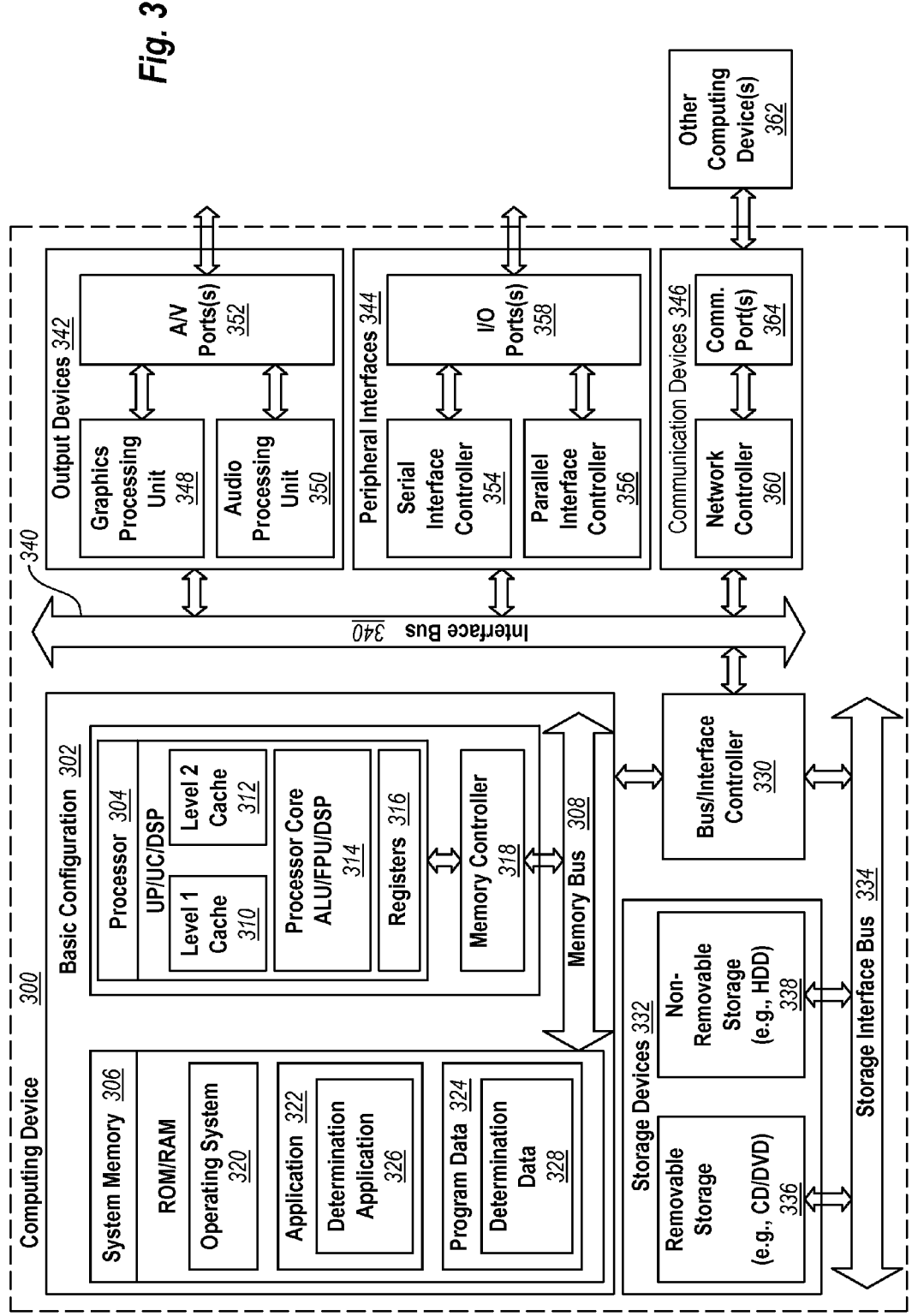
FIG. 3 illustrates an embodiment of a computing system that can implement some embodiments described herein.

FIG. 3 shows an example computing device 300 that is arranged to perform any of the computing methods described herein. In a very basic configuration 302, computing device 300 generally includes one or more processors 304 and a system memory 306. A memory bus 308 may be used for communicating between processor 304 and system memory 306.

Depending on the desired configuration, processor 304 may be of any type including but not limited to a microprocessor (μP), a microcontroller (μC), a digital signal processor (DSP), or any combination thereof. Processor 304 may include one more levels of caching, such as a level one cache 310 and a level two cache 312, a processor core 314, and registers 316. An example processor core 314 may include an arithmetic logic unit (ALU), a floating point unit (FPU), a digital signal processing core (DSP Core), or any combination thereof. An example memory controller 318 may also be used with processor 304, or in some implementations memory controller 318 may be an internal part of processor 304.

Depending on the desired configuration, system memory 306 may be of any type including but not limited to volatile memory (such as RAM), non-volatile memory (such as ROM, flash memory, etc.) or any combination thereof. System memory 306 may include an operating system 320, one or more applications 322, and program data 324. Application 322 may include a determination application 326 that is arranged to perform the functions as described herein including those described with respect to methods described herein. The determination application 326 may correspond to the determination module 124 of FIG. 1B, for example. Program Data 324 may include determination information 328 that may be useful for analyzing social media correspondences located on the social media webpage. In some embodiments, application 322 may be arranged to operate with program data 324 on operating system 320.

Computing device 300 may have additional features or functionality, and additional interfaces to facilitate communications between basic configuration 302 and any required devices and interfaces. For example, a bus/interface controller 330 may be used to facilitate communications between basic configuration 302 and one or more data storage devices 332 via a storage interface bus 334. Data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 306, removable storage devices 336 and non-removable storage devices 338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of computing device 300.

Computing device 300 may also include an interface bus 340 for facilitating communication from various interface devices (e.g., output devices 342, peripheral interfaces 344, and communication devices 346) to basic configuration 302 via bus/interface controller 330. Example output devices 342 include a graphics processing unit 348 and an audio processing unit 350, which may be configured to communicate to various external devices such as a display or speakers via one or more A/V ports 352. Example peripheral interfaces 344 include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which may be arranged to facilitate communications with one or more other computing devices 362 over a network communication link via one or more communication ports 364.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 300 may also be implemented as a personal computer including both laptop computer and non-laptop computer configurations. The computing device 300 can also be any type of network computing device. The computing device 300 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data that cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A method, comprising:
obtaining a plurality of keywords associated with a website;
identifying social media correspondence from social media referencing the plurality of keywords;
designating one of the plurality of keywords as a selected keyword based on the social media correspondence;
reviewing search results from a search engine that result from a search of the selected keyword on the search engine to identify a non-social media webpage from among the search results that is included in the website; and
recommending the identified non-social media webpage for engagement in the social media.

2. The method of claim 1, wherein recommending the identified non-social media webpage for engagement in the social media includes recommending material from the identified non-social media webpage for engagement in the social media.

3. The method of claim 2, wherein the material includes the selected keyword.

4. The method of claim 1, further comprising recommending creation of content related to content on the one or more non-social media webpages.

5. The method of claim 1, wherein the identified non-social media webpage is a highest ranking non-social media webpage in the website among the search results from the search engine, wherein the ranking is based on user traffic on the non-social media webpages of the website, conversions generated by the non-social media webpages of the website, conversion rate of the non-social media webpages of the website, and revenues generated by the non-social media webpages of the website.

6. The method of claim 1, wherein the one of the plurality of keywords is designated as the selected keyword based on a frequency that the selected keyword is included in the social media correspondence as compared to the frequency that other of the plurality of keywords are included in the social media correspondence.

7. A non-transitory computer-readable storage medium that includes instructions that when executed by one or more processors, cause the processors to perform operations including:
obtaining a plurality of keywords associated with a website;
identifying social media correspondence from social media referencing the plurality of keywords;
designating one of the plurality of keywords as a selected keyword based on the social media correspondence;
reviewing search results from a search engine that result from a search of the selected keyword on the search engine to identify a non-social media webpage from among the search results that is included in the website; and
recommending the identified non-social media webpage for engagement in the social media.

8. The non-transitory computer-readable storage medium of claim 7, wherein recommending the identified non-social media webpage for engagement in the social media includes recommending material from the identified non-social media webpage for engagement in the social media.

9. The non-transitory computer-readable storage medium of claim 8, wherein the material includes the selected keyword.

10. The non-transitory computer-readable storage medium of claim 7, wherein the operations further include recommending creation of content related to content on the one or more non-social media webpages.

11. The non-transitory computer-readable storage medium of claim 7, wherein the identified non-social media webpage is a highest ranking non-social media webpage in the website among the search results from the search engine, wherein the ranking is based on user traffic on the non-social media webpages of the website, conversions generated by the non-social media webpages of the website, conversion rate of the non-social media webpages of the website, and revenues generated by the non-social media webpages of the website.

12. The non-transitory computer-readable storage medium of claim 7, wherein the one of the plurality of keywords is designated as the selected keyword based on a frequency that the selected keyword is included in the social media correspondence as compared to the frequency that other of the plurality of keywords are included in the social media correspondence.

* * * * *